United States Patent [19]
Kaku et al.

[11] Patent Number: 5,093,972
[45] Date of Patent: Mar. 10, 1992

[54] TAPPING CONTROL UNIT

[75] Inventors: Masahiro Kaku; Shinichi Kono; Masaaki Fukukura, all of Oshino, Japan

[73] Assignee: Fanuc Ltd, Yamanashi, Japan

[21] Appl. No.: 635,493

[22] PCT Filed: May 11, 1990

[86] PCT No.: PCT/JP90/00603
§ 371 Date: Jan. 2, 1990
§ 102(e) Date: Jan. 2, 1990

[87] PCT Pub. No.: WO90/14192
PCT Pub. Date: Nov. 29, 1990

[30] Foreign Application Priority Data

May 24, 1989 [JP] Japan .................. 1-128784

[51] Int. Cl.$^5$ ................................ B23B 47/00
[52] U.S. Cl. .................. 29/27 C; 10/129 R; 318/35; 318/68; 364/474.02; 364/474.12; 408/9; 408/10
[58] Field of Search ............. 29/26 A, 27 C, 27 R; 408/9, 10, 13; 10/129 R, 136 E, 136 SC, 136 TS; 318/35, 67, 68, 69; 364/474.02, 474.12, 474.15

[56] References Cited

U.S. PATENT DOCUMENTS

| 4,587,697 | 5/1986 | Link et al. ............... | 29/27 C |
| 4,722,123 | 2/1988 | Pruvot et al. ............ | 29/27 C |
| 4,808,047 | 2/1989 | Calevich et al. ......... | 408/9 |
| 4,949,443 | 8/1990 | Saruwatari ............... | 29/27 C |
| 5,010,286 | 4/1991 | Nakamura et al. ....... | 364/474.15 |

FOREIGN PATENT DOCUMENTS 119360 9/1981 Japan .
1-21102 5/1989 Japan .

Primary Examiner—Daniel W. Howell
Attorney, Agent, or Firm—Staas & Halsey

[57] ABSTRACT

A control unit capable of driving a compound lathe so that an end face of a rotating workpiece can be tapped. The control unit (100) comprises first and second control circuits (110, 120) for controlling the rotation of first and second spindles (10, 20) respectively fitted with the workpiece (60) and a tapper (70). At start of tapping operation, the second control circuit executes position loop control in accordance with a deviation ($\epsilon$) between position feedback signals (PCC1, PCC2) related to the two spindles, thereby equalizing rotational speeds of the two spindles, and then causes the second spindle to rotate at a speed higher than that of the first spindle by a tapping speed in accordance with the deviation ($\epsilon$) between the feedback signal (PCC2) and the sum of the feedback signal (PCC1) and a tapping speed command (Vc) supplied from a host control unit (40), and causes the second spindle to move axially at a speed which depends on the tapping speed and a tapping pitch, thereby tapping the end face of the rotating workpiece. After completion of the tapping operation, the second spindle is reversely rotated and retreated so that the tapper is disengaged from the workpiece.

4 Claims, 2 Drawing Sheets

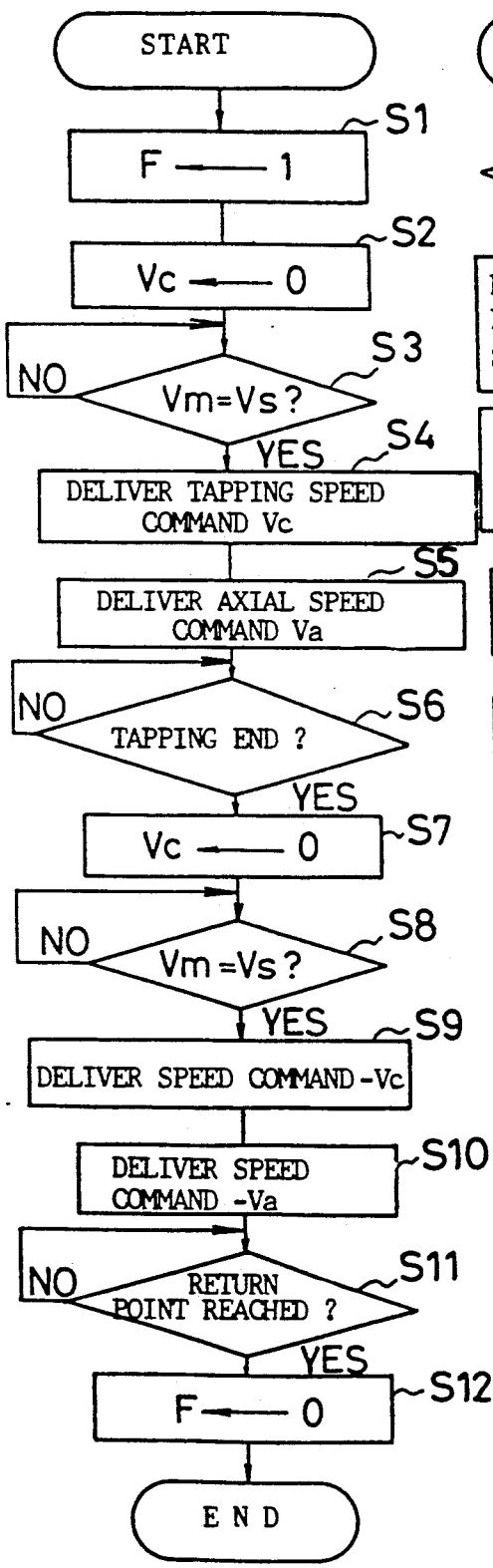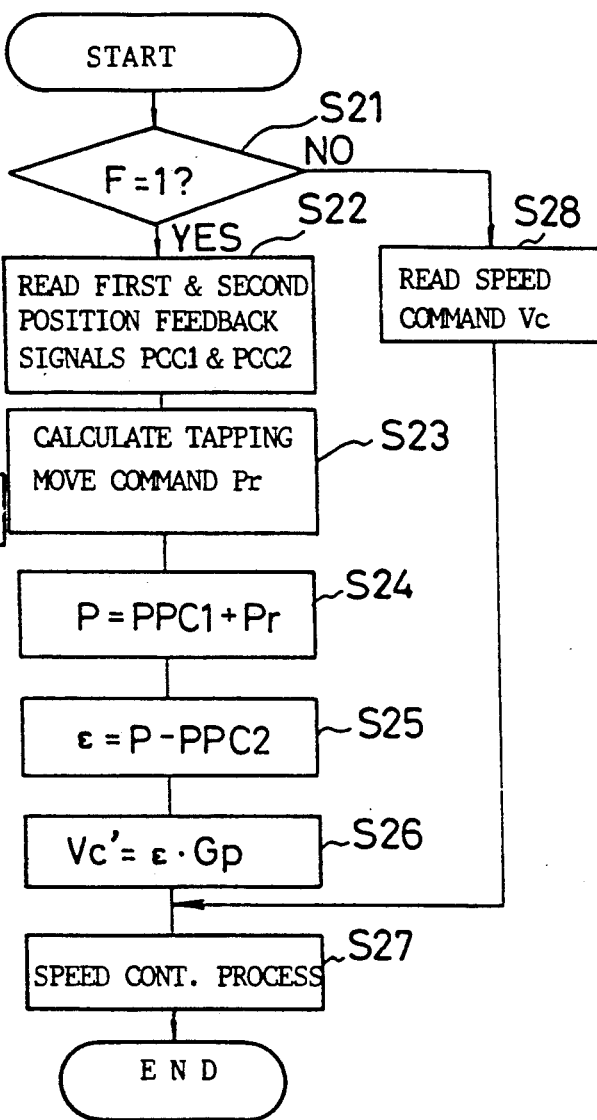

TAPPING CONTROL UNIT

TECHNICAL FIELD

The present invention relates to a control unit mounted on a machine having a workpiece rotating spindle and a tapping tool rotating spindle, and more particularly, to a tapping control unit for controlling the drive of both these spindles so that an end face of a rotating workpiece can be tapped.

BACKGROUND ART

Generally, in tapping an end face of a workpiece, the workpiece is stopped from rotating. Therefore, the tapping operation cannot be performed simultaneously with processing which cannot dispense with the workpiece rotation, e.g., cutting the peripheral surface of the workpiece. As a result, the total required processing time is lengthened, so that the processing efficiency lowers.

DISCLOSURE OF THE INVENTION

The object of the present invention is to provide a tapping control unit capable of controlling the drive of a machine, which has a workpiece rotating spindle and a tapping tool rotating spindle, so that an end face of a rotating workpiece can be tapped.

In order to achieve the above object, according to the present invention, there is provided a tapping control unit for use in a machine where a first spindle fitted with a workpiece is rotated by a first motor, and a second spindle fitted with a tapping tool is rotated by a second motor and axially driven by a third motor. The tapping control unit comprises a first control circuit for controlling the rotation of the first motor, a second control circuit for controlling the rotation of the second motor, a third control circuit for controlling the rotation of the third motor, a first position sensor coupled to the first spindle, and a second position sensor coupled to the second spindle, the second control circuit being adapted to execute position loop control for the first spindle in accordance with position feedback signals respectively supplied from the first and second position sensors and a tapping speed command supplied from a host control unit, thereby rotating the first and second spindles with a speed difference corresponding to the tapping speed command, and the third control circuit being adapted to control the rotation of the third motor so that the second spindle axially moves at a speed corresponding to the rotational speed difference between the first and second spindles.

According to the present invention, as described above, the workpiece and the tapping tool are rotated with the speed difference corresponding to the tapping speed command by executing the position loop control based on the position feedback signals from the first and second position sensors and the tapping speed command from the host control unit, while the first spindle fitted with the workpiece is rotating, and the second spindle is axially moved at the speed corresponding to the rotational speed difference. Thus, the end face of the workpiece can be tapped while rotating the workpiece at any desired rotational speed. As a result, the tapping operation can be performed simultaneously with cutting operation on the peripheral surface of the workpiece, for example, so that the total required processing time can be considerably shortened.

BRIEF DESCRIPTION OF THE DRAWINGS

FIG. 2 is a flowchart showing a tapping control process executed by a processor of a host numerical control unit shown in FIG. 1; and FIG. 3 is a flowchart showing position control loop processing and speed control loop processing for a second spindle executed by a processor of a second control circuit shown in FIG. 1.

BEST MODE OF CARRYING OUT THE INVENTION

Figure 1:
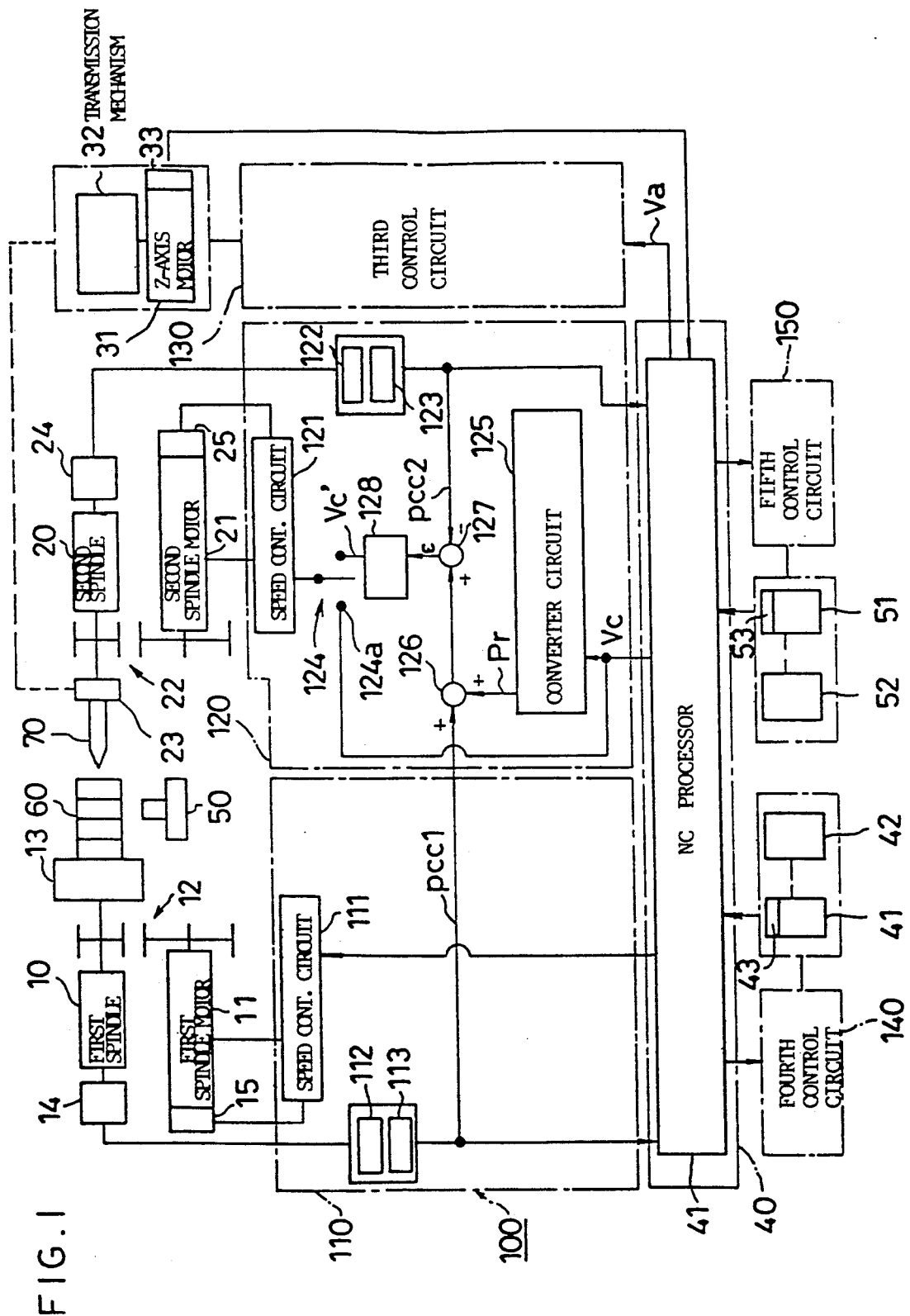
FIG. 1 is a schematic view showing a compound lathe mounted with a tapping control unit according to one embodiment of the present invention.

Referring to FIG. 1, a compound lathe, which serves as a tapping apparatus, comprises a first spindle (main spindle) 10 arranged to be rotatable, a second spindle (sub-spindle) 20 aligned with the first spindle and arranged to be rotatable and axially movable, and a tool rest 50 arranged for reciprocal motion in the axial direction of both these spindles and in a direction perpendicular thereto.

The first spindle 10 is operatively coupled to a first spindle motor 11 by means of a first transmission mechanism 12 which is formed of, e.g., a pair of gears. A chuck 13 for releasably holding a workpiece 60 is attached to one end of the first spindle 10 for rotation in unison with the first spindle. A first position coder 14 for detecting the rotational position of the first spindle 10 is coupled to the other end of the first spindle for rotation in unison with the first spindle. The first position coder 14 is arranged to generate a feedback pulse every time the first spindle rotates for a predetermined angle, and produce a one-revolution signal every time the first spindle takes a predetermined rotational position. The first spindle motor 11 is fitted with a first speed sensor 15 for detecting the rotational speed of the motor.

The second spindle 20 is operatively coupled to a second spindle motor 21, which is fitted with a second speed sensor 25 similar to the first speed sensor 15, by means of a second transmission mechanism 22 similar to the first transmission mechanism 12. A chuck 23 for releasably holding a tapper (tapping tool) 70 and a second position coder 24 similar to the first position coder 14 are connected individually to the opposite ends of the second spindle 20 for rotation in unison with the second spindle. Further, the second spindle 20 is operatively coupled to a third motor (Z-axis motor) 31, by means of a third transmission mechanism 32 for converting the rotatory force of the Z-axis motor into a linear driving force, so that the second spindle 20 reciprocates in the axial direction thereof as the Z-axis motor 31 rotates forwardly and reversely. Numeral 33 denotes a position sensor.

The tool rest 50 is coupled to fourth and fifth motors 41 and 51 provided with position sensors 43 and 53 by means of fourth and fifth transmission mechanisms 42 and 52 for converting the rotatory forces of the fourth and fifth motors 41 and 51 into linear driving forces, respectively. The tool rest 50 is arranged for reciprocal motion in the axial direction of the first and second spindles and in the direction perpendicular thereto with forward and reverse rotation of these two motors.

The compound lathe is mounted with a control unit 100 according to one embodiment of the present invention which operates under the control of a host control unit, e.g., a numerical control (NC) unit 40 having a processor 41. The control unit 100 is operable in any one of a plurality of operation modes, including a speed control mode for independently controlling the respective rotational speeds of the two spindles 10 and 20 and a tapping mode for effecting tapping operation by controlling the respective rotational speeds of the two spindles in association with each other. In the tapping mode, the control unit 100 serves as a tapping control unit. Further, the control unit 100 comprises first to third control circuits 110, 120 and 130 for controlling the first spindle motor 11, second spindle motor 21, and Z-axis motor 31, respectively, and fourth and fifth control circuits 140 and 150 for controlling the fourth and fifth motors 41 and 51, respectively. Each of the first to fifth control circuits is composed mainly of a microprocessor (processor 41 and processors of the first to fifth control circuits will be referred to as NC processor 41 and first to fifth processors, respectively, hereinafter).

The first control circuit 110 includes a speed control circuit 111 connected to the NC processor 41 and the first speed sensor 15 for performing speed loop control in accordance with a first spindle speed command from the NC processor and a speed feedback signal from the first speed sensor, a position counter 112 connected to the first position coder 14 for counting feedback pulses from the first position coder, and a latch circuit 113 connected to the first position coder 14 and the position counter for latching the count value of the position counter obtained when the one-revolution signal is delivered from the first position coder. The NC processor 41 is connected to the position counter 112, and is arranged to detect the rotational speed of the first spindle 10 in accordance with an output from the position counter, which is indicative of the rotational position of the first spindle. The position counter 112 may alternatively be provided outside the first control circuit 110, and the latch circuit 113 does not constitute an indispensable component of the present invention.

The second control circuit 120 includes a speed control circuit 121, a position counter 122, and a latch circuit 123 which correspond to the components 111 to 113, respectively, of the first control circuit 110. The speed control circuit 121 is arranged to be connected to the NC processor 41 through a switch 124 to receive a second spindle speed command (tapping speed command) from the NC processor when a movable contact of the switch 124 is shifted to the side of a first stationary contact 124a. Further, the second control circuit 120 comprises a converter circuit 125 connected to the NC processor 41 for converting the tapping speed command supplied therefrom into a tapping move command. The output terminal of the converter circuit is connected to a first positive input terminal of an adder 126. The adder 126, having a second positive input terminal and the output terminal thereof respectively connected to the output terminal of the position counter 112 of the first control circuit 110 and a positive input terminal of a subtractor 127, is arranged to provide the subtractor 127 with the sum of a position feedback signal (hereinafter referred to as first position feedback signal) for the first spindle 10 from the position counter 112 and the tapping move command from the converter circuit 125. The subtractor 127, having a negative input terminal and the output terminal thereof connected to the output terminal of the position counter 122 and the input terminal of a processing circuit 128, respectively, is arranged to subtract a position feedback signal (hereinafter referred to as second position feedback signal) for the second spindle 20 from the sum of the tapping move command and the first position feedback signal, to thereby produce a positional deviation $\epsilon$. Thus, the subtractor 127 functions as an error register of a position loop system associated with the second spindle 20. The processing circuit 128, which constitutes part of the position loop system and operates to decide a speed command by multiplying the positional deviation $\epsilon$ by a position loop gain Gp, and is arranged to be connected at the output terminal thereof to the speed control circuit 121 through a switch 124 when the movable contact of the switch 124 is shifted to the side of a second stationary contact 124b, so as to provide the speed control circuit 121 with the speed command supplied from the position loop system. The NC unit 40, connected to the position counter 122, is arranged to detect the rotational speed of the second spindle 20 in accordance with an output from the counter, which is indicative of the rotational position of the second spindle. As described above, the second control circuit 120 is formed of a processor, and is arranged to achieve, by software processing performed by the same processor, the functions of the speed control circuit 121, switch 124, converter circuit 125, adder 126, subtractor 127, and processing circuit 128.

Referring now to FIGS. 2 and 3, the operation of the compound lathe of FIG. 1 will be described.

At the start of operation in the speed control mode, the NC processor 41 resets flag information F stored in a memory (not shown), which is accessible from both the NC processor and the second processor, to the value "0" which is indicative of the speed control mode. Then, the NC processor 41 delivers speed commands for the first (main) and second (sub-) spindles. A first processor, which serves as the speed control circuit 111, controls the rotational speed of the first spindle motor 10 in accordance with the second spindle speed command. The second processor, on the other hand, periodically executes a second spindle control process shown in FIG. 3. More specifically, in each processing period, the second processor serving as the speed control circuit 121 determines whether or not the flag F is at the value "1" indicative of the tapping mode (Step S21). In the speed control mode, the decision in Step S21 is negative (in other words, the second processor shifts the switch 124 of the second control circuit 120 to the side of the first contact 124a by software processing). Then, the second processor reads the second spindle speed command Vc delivered from the NC processor 41 (Step S28), and performs speed control loop processing based on this command Vc, thereby controlling the rotational speed of the second spindle motor 21 (Step S27). After all, in the speed control mode, the first and second spindle motors 11 and 21, and hence the first and second spindles 10 and 20, are independently driven at different rotational speeds, in general.

In the aforementioned speed control mode, for example, the peripheral surface of the workpiece 60 is cut, with the rotational speed of the first spindle 10 controlled by the first control circuit 110 and with the moved position of the tool rest 50 controlled by the fourth and fifth control circuits 140 and 150. At the same time, a preliminary for tapping is bored in an end face of the workpiece, with the second spindle 20, mounted with a drill (not shown), controlled for a rotation stop state by the second control circuit 120 and with the axial position of the second spindle controlled by the third control circuit 130.

When the NC processor 41 reads a tapping command from an NC program, the drill mounted on the chuck 23 of the second spindle 20 is replaced with the tapper 70 by manual operation or by means of an automatic tool replacing machine (not shown) which operates under the control of the NC processor 41. While reading the tapping command, the NC processor 41 sets the flag F to the value "1," which is indicative of the tapping mode (Step S1), and delivers the second spindle speed command (tapping speed command) Vc of the value "0" (Step S2). If necessary, the NC processor 41 delivers the first spindle speed command to the first processor and also delivers commands to the fourth and fifth control circuits 140 and 150. As a result, the peripheral surface of the workpiece is cut, for example.

In Step S21 of the NC processing period immediately after the value of the flag F is set to "1," the second processor discriminates this, shifts the switch 124 to the side of the second contact 124b, and then reads first and second position feedback signals PCC1 and PCC2 from the first and second position counters 112 and 122, respectively (Step S22). Then, the second processor serving as the converter circuit 125 reads the tapping speed command Vc (=0), and calculates a tapping move command Pr according to the following operational expression (Step S23).

$$Pr = Vc/T \cdot Gp$$

where T represents a processing period of position loop control which the second processor periodically executes, and Gp represents the control gain for the position loop control.

Subsequently, the second processor, which serves as the adder 126, calculates a move command P (=Pr+PPC1) for the second spindle 20 on the basis of the tapping move command Pr (="0") thus calculated and a count value (first position feedback signal) PPC1 of the first position counter 112, which is indicative of the rotational position of the first spindle 10 (Step S24). The second processor, which then serves as the subtractor 127, calculates the positional deviation $\epsilon$ (=P−PPC2) on the basis of the move command P thus calculated and a count value PPC2 of the second counter 122, which is indicative of the rotational position of the second spindle 20 (25). Further, the second processor serves as the processing circuit 128, which calculates a corrected speed command Vc' by multiplying the positional deviation $\epsilon$ by the position loop gain Gp (Step S26). After all, the position loop control is effected by the second processor so that the actual rotational position of the second spindle 20 is adjusted to the target position P. Then, the second processor, which serves as the speed control circuit 121, controls the rotational speed of the second spindle 20 in response to the corrected speed command Vc'(Step S27). In this case, P=PCC1, that is, the first position feedback signal PCC1 functions as the move command P for the second spindle 20. As a result, the rotational speed of the second spindle 20 is controlled so that the rotational speed of the second spindle follows the rotational speed of the first spindle. Thus, the second spindle rotational speed Vs gradually follows up the first spindle rotational speed Vm.

While the first and second spindles 10 and 20 are being thus subjected to speed control in response to the speed commands from the NC processor 41 and the corrected speed command Vc' from the position loop control system (processing circuit 128) of the second control circuit, individually, the NC processor 41 calculates the first and second spindle rotational speeds Vm and Vs on the basis of the respective count values of the first and second position counters 112 and 122, and repeatedly determines whether or not the two values are equal to each other (Step S3). If it is concluded that the two rotational speeds Vm and Vs are equal to each other, the NC processor 41 delivers the tapping speed command Vc, read from the program, to the second processor in place of the tapping speed command Vc of the value "0" (Step S4).

In Step S23 of the processing period immediately after the program-assigned tapping speed command Vc is delivered, the second processor calculates the tapping move command Pr (=Vc/T·Gp) according to the aforementioned operational expression. Then, the second processor obtains the positional deviation $\epsilon$ (=Pr+PCC1−PCC2) by subtracting the second position feedback signal PCC2 from the sum of the move command Pr and the first position feedback signal PCC1 (Steps S24 and S25). In Step S26, moreover, the second processor obtains the corrected speed command Vc' by multiplying the positional deviation $\epsilon$ by the control gain Gp, that is, performs the position loop control operation. Then, the second processor performs the speed control operation in accordance with the corrected speed command Vc' (Step S27). In contrast with the case of the aforementioned speed control mode, the value of the target rotational position of the second spindle 20 increases by a value equivalent to the tapping move command Pr, so that the positional deviation $\epsilon$ increases. As a result, the second spindle rotational speed Vs becomes higher than the first spindle rotational speed Vm by the tapping speed command Vc. After all, the first and second spindles 10 and 20 individually rotate with a speed difference corresponding to the tapping speed.

Then, the NC processor 41 delivers a speed command Va for the axial movement of the second spindle 20, which is determined in dependence on the tapping speed command Vc and a tapping pitch (pitch of a screw to be processed), to a third processor (Step S5). The third processor drives the Z-axis motor 31 in accordance with this speed command. As a result, the second spindle 20 and the tapper 70 thereon integrally move toward the workpiece 60 while integrally rotating at a speed which is higher than the rotational speed of the workpiece by the tapping speed. Thereafter, the tapper 70 further moves axially in the aforesaid direction while rotating, whereby rigid tapping in the end face of the workpiece 60 is effected. The tapping operation can be executed simultaneously with the cutting of the peripheral surface of the workpiece, for example.

During the tapping operation, NC processor 41 detects the axial moved position of the tip of the tapper 70 in accordance with a feedback signal from the position sensor 33 which is connected to the Z-axis motor 31, and repeatedly determines, by the detected tapper position, whether or not the tapping for a program-assigned length is completed (Step S6).

When the NC processor 41 discriminates the completion of the tapping operation, it delivers the tapping speed command Vc of the value "0." As a result, the second spindle rotational speed Vs changes following the first spindle rotational speed Vm, as in the case where the speed command Vc (=0) is delivered in Step S2. In the meantime, the NC processor 41 repeatedly determines whether or not the respective rotational speeds of the two spindles are equal (Step S8). If it concludes, thereafter, that the first spindle rotational speed Vm is equal to the second spindle rotational speed Vs, the NC processor 41 delivers a second spindle speed command −Vc, which is equal in magnitude to the tapping command Vc and has a sign opposite to that of the command Vc (Step S9), and also delivers an axial speed command −Va, which is equal in magnitude to the axial speed command Va delivered during the tapping operation and has a sign opposite to that of the command Va, to the third processor (Step S10). As a result, the second spindle 20 and the tapper 70 move away from the workpiece 60 while rotating in the direction opposite to that for the tapping operation and at a speed lower than the workpiece rotational speed Vm by the tapping speed Vc. While the second spindle 20 and the tapper 70 are retreating, the NC processor 41 repeatedly determines whether or not a predetermined return point is reached by the second spindle 20 (Step S11). If it discriminates the arrival at the return point, the NC processor 41 resets the flag F to the value "0" which indicates that the operation mode is not the tapping mode (Step S12), and the delivery of the speed commands to the second and third processors is stopped, whereupon the control associated with the tapping operation is finished.

We claim:
1. A tapping control unit for use in a machine where a first spindle fitted with a workpiece is rotated by a first motor, and a second spindle fitted with a tapping tool is rotated by a second motor and axially driven by a third motor, said tapping control unit comprising:
a first control circuit for controlling the rotation of said first motor;
a second control circuit for controlling the rotation of said second motor;
a third control circuit for controlling the rotation of said third motor;
a first position sensor coupled to said first spindle; and
a second position sensor coupled to said second spindle, said second control circuit being adapted to execute position loop control for said first spindle in accordance with position feedback signals respectively supplied from said first and second position sensors and a tapping speed command supplied from a host control unit, thereby rotating said first and second spindles with a speed difference corresponding to the tapping speed command, and said third control circuit being adapted to control the rotation of said third motor so that said second spindle axially moves at a speed corresponding to the rotational speed difference between said first and second spindles.

2. A tapping control unit according to claim 1, wherein said first control circuit includes a converter circuit for converting the tapping speed command into a tapping move command corresponding thereto, an adder for adding the tapping move command and the position feedback signal from said first position sensor, and a subtractor for subtracting the position feedback signal supplied from said second position sensor from an output of said adder.

3. A tapping control unit according to claim 2, wherein said first control circuit includes a speed control circuit for controlling a rotational speed of said first motor, and said second control circuit includes a circuit for multiplying an output of said subtractor by a position loop gain and a speed control circuit for controlling a rotational speed of said second motor in accordance with an output of said circuit.

4. A tapping control unit according to claim 1, further comprising a fourth control circuit for controlling rotation of a fourth motor for driving a tool rest of said machine in the axial direction of said second spindle, and a fifth control circuit for controlling rotation of a fifth motor for driving said tool rest in a direction perpendicular to the axis of said second spindle.

* * * * *